United States Patent
Nakano et al.

(10) Patent No.: US 6,822,802 B2
(45) Date of Patent: Nov. 23, 2004

(54) TERRESTRIAL TELESCOPE WITH DIGITAL CAMERA

(75) Inventors: Hirokatsu Nakano, Gamagori (JP); Yoshihide Goto, Gamagori (JP); Shuichi Tominaga, Gamagori (JP); Takayuki Ishida, Gamagori (JP)

(73) Assignee: Kowa Company Ltd., Nagoya (JP)

( * ) Notice: Subject to any disclaimer, the term of this patent is extended or adjusted under 35 U.S.C. 154(b) by 0 days.

(21) Appl. No.: 10/331,539

(22) Filed: Dec. 27, 2002

(65) Prior Publication Data

US 2004/0100690 A1 May 27, 2004

(30) Foreign Application Priority Data

Nov. 25, 2002 (JP) ........................... 2002-340426

(51) Int. Cl.⁷ ............................ G02B 27/14; G02B 23/00
(52) U.S. Cl. ........................ 359/637; 359/399; 359/381
(58) Field of Search ............................... 359/362–363, 359/381–401, 422–432, 637–640; 396/72–83, 354–359

(56) References Cited

U.S. PATENT DOCUMENTS

| | | | | |
|---|---|---|---|---|
| 4,757,387 A | * | 7/1988 | Saito | 348/342 |
| 5,070,350 A | * | 12/1991 | Harvey | 396/60 |
| 5,355,253 A | * | 10/1994 | Nanjo et al. | 359/473 |
| 5,457,511 A | * | 10/1995 | Kanai et al. | 396/355 |
| 5,668,621 A | * | 9/1997 | Nanjo | 351/206 |
| 6,407,766 B1 | * | 6/2002 | Ramanujan et al. | 347/239 |

FOREIGN PATENT DOCUMENTS

JP 2000-162495 * 6/2000 ................ 359/431

* cited by examiner

*Primary Examiner*—Thong Q Nguyen
(74) *Attorney, Agent, or Firm*—Adams & Wilks

(57) ABSTRACT

A terrestrial telescope with digital camera includes objective lenses, an imaging element located downstream of the objective lenses, a retractable optical-path splitter between the objective lenses and the imaging element, and an optical system for observing an optical image divided from the optical path of the imaging optical system by the optical-path splitter. An optical element is inserted into the optical axis of the imaging optical system to correct for any change in the image-formation position when the optical-path splitter is retracted from the optical path of the imaging optical system during imaging.

20 Claims, 3 Drawing Sheets

FIG. 4

ANGLE OF INCIDENCE, DEVIATION AND
THICKNESS OF CORRECTION GLASS
FOR d=1(mm), n=n'=1.51633

| θ (°) | δ (mm) | d' (mm) |
|---:|---:|---:|
| 35 | 0.52 | 1.53 |
| 36 | 0.53 | 1.55 |
| 37 | 0.54 | 1.57 |
| 38 | 0.54 | 1.60 |
| 39 | 0.55 | 1.62 |
| 40 | 0.56 | 1.65 |
| 41 | 0.57 | 1.67 |
| 42 | 0.58 | 1.69 |
| 43 | 0.59 | 1.72 |
| 44 | 0.59 | 1.75 |
| 44.999 | 0.60 | 1.77 |
| 45.001 | 0.60 | 1.77 |
| 46 | 0.61 | 1.80 |
| 47 | 0.62 | 1.83 |
| 48 | 0.63 | 1.85 |
| 49 | 0.64 | 1.88 |
| 50 | 0.65 | 1.91 |
| 51 | 0.66 | 1.94 |
| 52 | 0.67 | 1.97 |
| 53 | 0.68 | 2.00 |
| 54 | 0.69 | 2.03 |
| 55 | 0.70 | 2.06 |

TERRESTRIAL TELESCOPE WITH DIGITAL CAMERA

BACKGROUND OF THE INVENTION

1. Field of the Invention

The present invention relates to a terrestrial telescope with a digital camera that uses a means of splitting the optical path so that the optical path goes to the imaging element and the observation optical system.

2. Description of the Prior Art

Terrestrial telescopes having a magnification factor ranging from about 20 to 60 are used extensively for observing wild birds and other fauna. Terrestrial telescopes include those based on a Galilean telescope configuration comprising a positive (convex) lens and a negative (concave) lens that functions as an erecting system, and those based on a Keplerian telescope configuration comprising just a positive (convex) lens, to which are added prisms or other such elements to constitute an erecting system. Both types of telescope enable a user to observe an erect image.

As well as being able to use such telescopes to observe natural flora and fauna, users want to be able to record the images they are seeing. In Japanese Patent Application No. 2002-47304, the present applicant proposed a configuration for a terrestrial telescope with a digital camera that is able to record an observed image.

In the above mentioned Japanese Application the structure of the main optical system except for the observation optical system is similar to that of a single lens reflex camera, and the optical system uses a total-reflection quick-return mirror. Unlike a single lens reflex camera that uses silver-halide film, a single lens reflex digital camera uses a fixed half-mirror to split the optical path so that the beam transmitted by the imaging lens goes to the observation optical system and the imaging element. This makes it possible to continuously use images on the imaging element for display on a monitor, auto-focus processing, calculating exposure, and so forth, and because there is no movable mirror, the configuration can be made simple and low-cost. On the other hand, this configuration reduces the amount of light.

In this respect, Japanese Patent Laid-Open Publication No. 2000-162495 discloses an optical system in which a half-mirror constituted as a quick-return mirror is used to deflect part of the light beam from the subject through the objective lens to the observation optical system and the rest of the beam to the imaging element. In this Publication, the half-mirror is normally located at an observation position at which it deflects part of the subject light beam to the observation optical system and is controlled during imaging to be removed from the imaging optical path. When the half-mirror is in the observation position, the imaging element receives a beam through the half-mirror and photo-electrically converts it to calculate and memorize the focusing position of the objective lens when the half-mirror will be retracted. When the half-mirror is actually retracted to the imaging position during the imaging, the objective lens is moved to the calculated focus position.

The configuration disclosed by Japanese Patent Laid-Open Publication No. 2000-162495 is advantageous in that it avoids light loss during the imaging of the subject and can move the imaging lens to correct a focusing error arising when the half-mirror is retracted. However, it also has drawbacks in that a processor and memory are required for calculating and storing the focus position, which increases the manufacturing cost.

An object of the present invention is therefore to provide a terrestrial telescope with a digital camera that enables the imaging element to continuously perform imaging without loss of light, and in which the focus position of the imaging element can be corrected with a simple and low-cost configuration.

SUMMARY OF THE INVENTION

A terrestrial telescope with a digital camera according to the invention comprises a group of objective lenses; an imaging optical system including the group of objective lenses and an imaging element disposed at a position at which an image of a subject is formed by the group of objective lenses; an optical-path-splitting means disposed on the optical path of the imaging optical system between the group of objective lenses and the imaging element so as to be retractable from the optical path of the imaging optical system during imaging; an observation optical system for observing an optical image of the subject via the optical-path-splitting means disposed on the optical path of the imaging optical system; and an imaging position correction means including an optical element that is inserted into the optical axis of the imaging optical system to correct for any change in image-formation position when the optical-path-splitting means is retracted from the optical path of the imaging optical system during imaging.

The optical element can be comprised of a plane glass element of a thickness that corrects for the change in image-formation position arising when the optical-path-splitting means is retracted.

The retraction of the optical-path-splitting means and the insertion of the optical element can be controlled by means of a guide lever that supports the imaging position correction means on one end and the optical-path-splitting means on the other end.

Prescribed optical filtering characteristics can be imparted to the optical element and to the side of the optical-path-splitting means from which light exits to the imaging element.

The plane glass element can be inserted perpendicularly to the optical axis of the imaging optical system.

Further features of the invention, its nature and various advantages will be more apparent from the accompanying drawings and following detailed description of the invention.

BRIEF DESCRIPTION OF THE DRAWINGS

FIG. 4 is a table showing the amounts of image deviation produced by the quick-return half-mirror in the apparatus of FIG. 1, and the corresponding calculated thicknesses of the plane glass element used to correct the deviation.

DESCRIPTION OF THE PREFERRED EMBODIMENT

Figure 1:
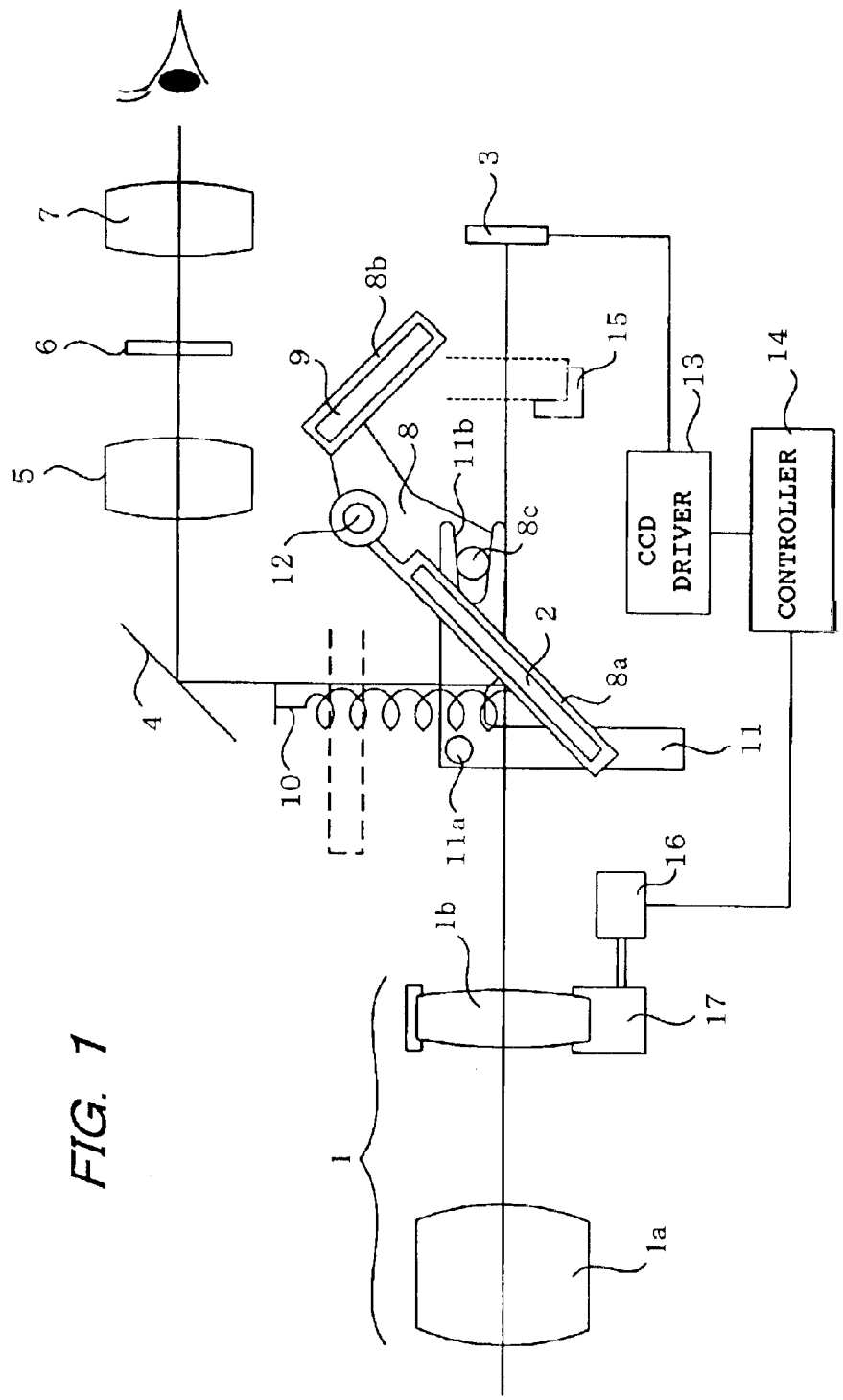
FIG. 1 is an explanatory view showing the general configuration of a terrestrial telescope with a digital camera according to the present invention.

FIG. 1 shows the main parts of the terrestrial telescope with a digital camera configured according to the present invention. In FIG. 1, a group of objective lenses 1 comprises a fixed lens group 1a and a movable focusing lens group 1b. A light beam transmitted by the group of objective lenses 1 falls incident on an optical beam splitter in the form of a quick-return half-mirror (shortened to "QR half-mirror" hereinbelow) 2 that normally intersects the main optical axis (the optical axis of the group of objective lenses 1) at an angle of 45 degrees. The movable focusing lenses group 1b is maintained by a lenses frame 17 and can be moved along the main optical axis by an AF (automatic focusing) motor 16.

The portion of the beam of light transmitted by the QR half-mirror 2 impinges on an imaging element (such as a CCD or CMOS imaging element) 3 located on the focal plane. The portion of the beam of light reflected by the QR half-mirror 2 impinges on the observation optical system and, via an erecting optical system composed of a combination of a penta roof prism (not shown) or a reflecting mirror 4 and a relay lens 5, forms an image on a reticle 6 located at a position that is a conjugate to that of the focal plane. A user can observe the erect image via an ocular 7.

The reflectance of the QR half-mirror 2 is arbitrary. However, a reflectance of 80% to 90% is used so that most of the light goes to the observation optical system, facilitating observation by a user. The QR half-mirror 2 is affixed to a mirror holder 8a provided on an end of a mirror guide lever 8 of metal or glass. The mirror guide lever 8 can rotate about an axis of rotation 12. A plane glass holder 8b is provided on the opposite end of the mirror guide lever 8 located at the other side of the axis of rotation 12. A plane glass 9 is affixed to the plane glass holder 8b. The transmissivity of the plane glass 9 is substantially 100%.

In the example of FIG. 1, the QR half-mirror 2 and plane glass 9 are maintained at an angle of 90 degrees to each other by the mirror holder 8a and plane glass holder 8b. Attached to the mirror holder 8a is an extension spring 10 which urges the mirror holder 8a and QR half-mirror 2 around the axis of rotation 12 in a clockwise direction which is the direction of retraction from the imaging optical path.

During observation, the QR half-mirror 2 is kept at 45 degrees to the main optical axis against the urging of the extension spring 10 by an L-shaped retaining lever 11. The retaining lever 11 has a groove 11b at the end of its horizontal arm to engage with a pin 8c provided on the mirror guide lever 8. The retaining lever 11 can rotate about an axis of rotation 11a in the bend between the two arms of the L shape. The retaining lever 11 is maintained during observation in the position indicated in the drawing by a solid line using a solenoid or other such mechanical means, which are connected with a release button (not shown) for triggering to perform imaging. Thus, during observation, the QR half-mirror 2 is maintained at 45 degrees to the main axis.

When an imaging operation is initiated by the user, the retaining lever 11 is released. This allows the mirror guide lever 8 to be rotated clockwise by the force of the extension spring 10, moving the mirror holder 8a and QR half-mirror 2 to the respective positions indicated by the dotted lines. As described, the QR half-mirror 2 and plane glass 9 are maintained at 90 degrees to each other by the mirror holders 8a and 8b, so the movement of the QR half-mirror 2 to the horizontal position shown by the dotted line causes the plane glass 9 to move into a position in front of the imaging element 3 where it forms an angle of 90 degrees with respect to the optical axis of the group of objective lenses 1. The plane glass 9 (QR half-mirror 2) moves until the plane glass holder 8b is stopped by engagement with a stop 15. In this way, all of the light transmitted by the group of objective lenses 1 reaches the imaging element 3, so that the optical image of the subject falls incident on the imaging element 3 without loss of light due to the QR half-mirror 2.

A CCD driver 13 drives the imaging element 3, whose output is input to a controller 14 composed of a microprocessor, memory and other such components. Image data received from the imaging element 3 during the imaging is stored on a memory card or other such recording medium (not shown) by the controller 14. In this embodiment, during observation the light from the subject is able to enter the imaging element 3 via the QR half-mirror 2. Therefore, the image data thus obtained from the imaging element 3 during observation can be processed for display on a monitor (not shown), processed for automatic focusing by using the AF motor 16 to control the movable focusing lens group 1b, or used for calculations for controlling exposures, and so forth.

A CCD or other such device can be used for the imaging element 3. However, devices such as CCDs are often sensitive to infrared light, and aberration from infrared regions can have an adverse effect on image quality, exposure control and automatic focusing control and the like. Taking that into consideration, it is preferable to provide the downstream side of the plane glass 9 and/or the QR half-mirror 2 with a coating or the other such means that filters out infrared light. Providing the plane glass 9 with IR-blocking filter characteristics will eliminate infrared light when the plane glass 9 is inserted during imaging, thereby preventing degradation of the image quality. Moreover, the rear surface of the QR half-mirror 2 (the imaging element side) can be provided with a coating that blocks infrared. This assures the precise control of exposure and automatic focus control using the imaging element 3.

If infrared light only needs to be blocked during imaging, infrared-blocking properties only need to be imparted to the plane glass 9. When infrared blocking is required during both imaging and observation, the QR half-mirror 2 and the plane glass 9 are both given infrared-blocking characteristics. Only the QR half-mirror 2 needs to be given infrared-blocking properties if such characteristics are only required during observation. Normally the light beam is allowed to enter the observation optical system without infrared filtering, in which case it is not necessary for the QR half-mirror 2 to be provided with an infrared-blocking coating.

Although optical filtering characteristics of the QR half-mirror 2 and plane glass 9 have been described with reference to blocking infrared light, if desired a person skilled in the art can provide the QR half-mirror 2 and plane glass 9 with low-pass or band-pass or other such spatial frequency filter characteristics for adjusting automatic focusing performance. Moreover, when the subject is underwater, polarizing filter characteristics can be provided to remove the effect of reflections from the water, or ND filter characteristics or the like can be provided for adjusting the exposure gain. Providing the QR half-mirror 2 and/or the plane glass 9 with prescribed filter characteristics makes it possible to optimize the conditions for imaging and observation, and for exposure and automatic focus control prior to the imaging.

The operation of the terrestrial telescope with a digital camera thus configured will now be described.

A user half-presses the release button (not shown) to switch the system on when the QR half-mirror 2 is in the observation position shown in FIG. 1. The controller 14 then detects the light from the subject entering the imaging element 3 via the QR half-mirror 2 and performs photoelectrical conversion to detect the brightness and the contrast by a conventional contrast detection method.

The controller 14 can then determine the electronic shutter speed of the imaging element based on the detected brightness of the subject, drive the AF motor 16 based on the detected contrast, and control the automatic focusing process by moving the movable focusing lens group 1b along the optical axis. That is, the controller 14 drives the AF motor 16 to move the movable focusing lens group 1b to the focus position at which the imaging element 3 can produce an image with the optimum contrast.

Figure 2:
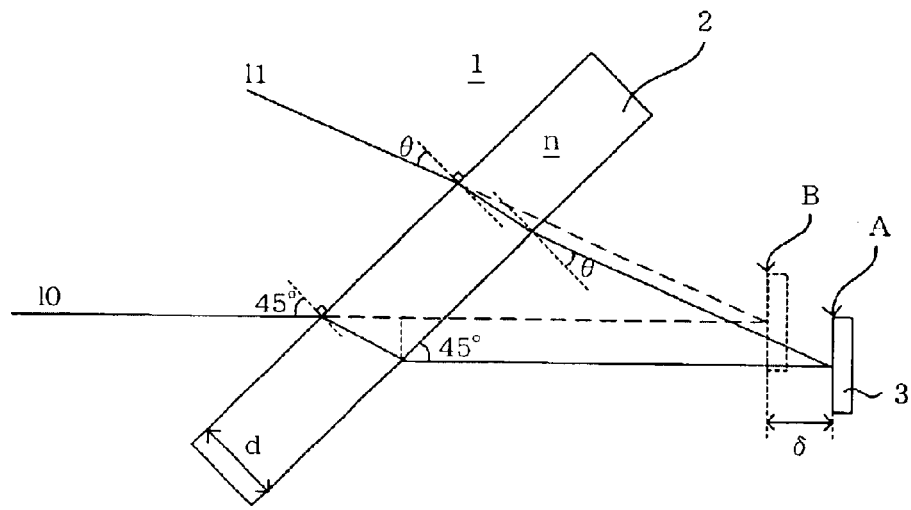
FIG. 2 is an explanatory view showing the quick-return half-mirror inserted into the main optical system during observation in the apparatus of FIG. 1.

The focus position is determined based on the photoelectrical output of the subject image transmitted by the QR half-mirror 2 to fall incident on the imaging element 3. When the QR half-mirror 2 is retracted for imaging, the focus position will change unless the plane glass 9 is inserted into position. In FIG. 2, it is assumed that A is the position of an image formed by the light transmitted by a QR half-mirror 2 having a thickness d, and B is the position of the image when there is no QR half-mirror 2 or plane glass 9. The image-formation position A will be further away from the QR half-mirror 2 than image-formation position B because the refractive index n of the QR half-mirror 2 is n>1 (refractive index n of air is 1).

The image-formation positional deviation δ between when there is a QR half-mirror 2 and when there is neither a QR half-mirror 2 nor a plane glass 9 can be geometrically expressed as shown in Equation (1) in terms of movement of the image-formation position along the optical axis by the central beam 10 and the peripheral beam 11.

$$\delta = \frac{d}{\cos\theta - \sin\theta} \left\{ \frac{\sqrt{2n^2-1}-1}{\sqrt{4n^2-2}} (\cos\theta+\sin\theta) - \sqrt{2}\left(\sin\theta - \frac{\cos\theta\sin\theta}{\sqrt{n^2-\sin^2\theta}}\right) \right\} \quad (1)$$

Here, the glass (or whatever other material is used) of the QR half-mirror 2 is assumed to have a refractive index of n, the angle of incidence of the central beam 10 on the QR half-mirror 2 is assumed to be 45 degrees, and the angle of incidence of the peripheral beam 11 on the QR half-mirror 2 is assumed to be θ.

In this embodiment, the deviation between image-formation positions A and B is corrected by means of the plane glass 9. When the release button is fully depressed, the retaining lever 11 rotates counterclockwise, allowing the QR half-mirror 2 to retract and the plane glass 9 to descend into the optical axis until it engages with the stop 15.

Figure 3:
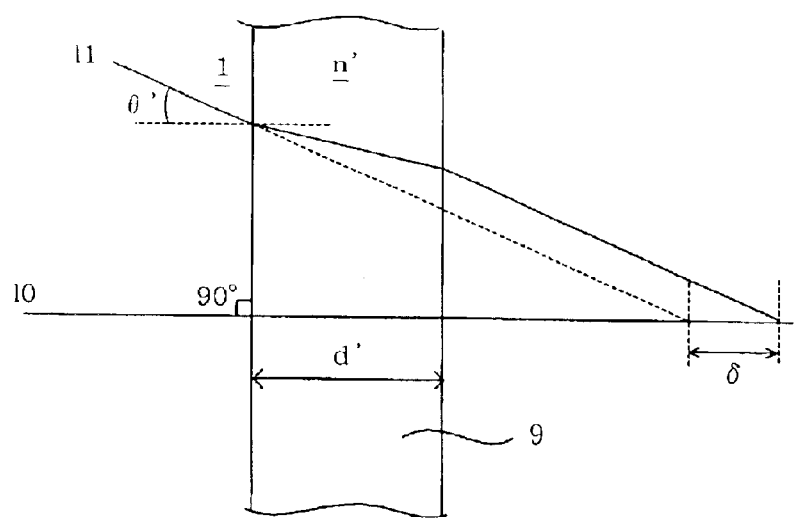
FIG. 3 is an explanatory view showing the plane glass element inserted into the main optical system during imaging in the apparatus of FIG. 1.

FIG. 3 shows the plane glass 9 inserted into the main optical axis during imaging, wherein it is assumed that the plane glass 9 is inserted perpendicularly to the optical axis after the retraction of the QR half-mirror 2. The deviation δ in the position of the images formed by the central beam 10 and the peripheral beam 11 can be approximated as shown in Equation (2) with the refractive index n' of the plane glass 9 and the thickness d' of the plane glass 9.

$$\delta = d'(1-1/n') \quad (2)$$

Equation (2) is based on Snell's law. When the plane glass 9 is inserted so that it intersects the optical axis at an angle of 90 degrees as shown in FIG. 3, Equation (2) teaches that the term relating to the angle of incidence θ' of the peripheral beam 11 can be neglected and the image deviation δ is determined by the thickness d' and refractive index n' of the plane glass 9. It therefore follows that the required thickness d' of the plane glass 9 can be calculated by resolving the equations in respect of plane glass thickness d' by substituting the right-side term of Equation (1) for the left-side term of Equation (2) to equalize the amount of image deviation δ of the left sides of Equations (1) and (2).

FIG. 4 shows the calculated values. Specifically, the table lists the calculated values obtained using Equations (1) and (2) under the condition that a QR half-mirror 2 has thickness d of 1 (mm) and the QR half-mirror 2 and plane glass 9 have the same glass with a refractive index n=n'=1.51633.

The results of FIG. 4 show that the amount of deviation δ to be corrected is not constant, but depends on the angle of incidence θ of the peripheral beam 11 shown in FIG. 2. If the QR half-mirror 2 is inserted at an angle of 45 degrees, the deviation δ increases with the increase in the angle of incidence θ of the peripheral beam 11. (There is a special case, which is when θ is 45 degrees at which δ=infinite and there is no image formation.) Thus, it can be said that coma aberration produced by the QR half-mirror 2 cannot be completely removed unless the thickness of the inserted plane glass 9 is gradually changed. As can be seen from Equation (2), the amount of axial deviation due to the correction glass is not affected by θ.

However, there is more emphasis on the central field of view than on the peripheral in the actual optical system whether it is a case of the contrast calculation area or the captured image. That is, calculations are made with emphasis on the paraxial region of the peripheral beam 11 (at an angle of incidence θ close to 45 degrees), so the calculated results of FIG. 4 are also employed with respect to θ=45 degrees. This means that a plane glass thickness d' of 1.77 mm is employed to eliminate image deviation.

The effect of inserting the plane glass 9 compared to not inserting the plane glass 9 can be evaluated as follows.

With reference to FIG. 4, the amount of focal deviation (δ) along the optical axis between when the QR half-mirror 2 is retracted from the optical axis and when it is inserted is a maximum of 0.70 mm when there is no plane glass 9. Inserting a plane glass 9 having a thickness of 1.77 mm corrects the deviation at the center of the viewing angle, so the range of deviation is 0.70−0.60=0.10 mm.

If the QR half-mirror 2 is retracted and no correction is made, such as by the insertion of the plane glass 9 in the case of the example of this embodiment, then the camera is, for example, operated using the automatic focus control conditions calculated with the QR half-mirror 2 in the non-retracted position. This will degrade the image quality. The degree of degradation vary depending on various factors such as the depth of field (stop) during the image pickup, so that the degradation will be severe if the depth of field is kept shallow.

In accordance with this embodiment, the deviation from the image-formation position when the QR half-mirror 2 was in the inserted position can be corrected by inserting the plane glass 9. Therefore, even if the system is operated using the automatic focusing control conditions calculated with the QR half-mirror 2 in the inserted position, the degree of image degradation will be reduced. In particular, in accordance with this embodiment the plane glass 9 is inserted perpendicularly to the optical axis. This causes the effect of the plane glass 9 for correcting the image-formation position to act equally with respect to imaging light rays in various directions (refer to the non-dependence on angle of incidence θ' of the peripheral beam in Equation (2)), and as shown in FIG. 4, during imaging there is no image degradation caused by image-formation positional deviation arising from a dependency on the direction of the peripheral light involved in the image formation.

Thus, the use of the plane glass 9 makes it possible in accordance with the embodiment to correct changes in the image-formation position arising from the retraction of the QR half-mirror 2 from the optical axis. After inserting the plane glass 9, the imaging element 3 images the subject for the exposure time, which is determined when the release button was half-pressed. When the imaging is completed, the controller 14 operates a drive motor (not shown) to return the QR half-mirror 2 and plane glass 9 to the standby position.

The terrestrial telescope with a digital camera according to the invention employs an optical-path-splitting means in the form of a half-mirror that is used to direct light from the subject to both the imaging element and the observation optical system. During imaging the half-mirror is removed from the main optical system, and an optical element (the plane glass 9) is inserted into the main optical system to correct for any deviation in the image-formation position caused by the retraction of the half-mirror. Therefore, there is no loss of incident light to the imaging element during the imaging. Moreover, no processor or memory has to be used, and the plane glass 9 used for the positional correction is a simple optical element, enabling deviation of the focus position to be corrected using a configuration that is very simple and low-cost. Since a half-mirror is used to split the optical path, the imaging element can be used during observation to acquire imaging data for various purposes such as exposure adjustments, monitor display and automatic focus adjustments.

Moreover, the plane glass 9 and the QR half-mirror 2 constituting the optical-path-splitting means are not maintained on separate levers but on the ends of a single, rigid mirror guide lever 8, which is used to position the QR half-mirror 2 and plane glass 9. This reduces the number of parts and enables the apparatus to be achieved easily and at a low cost. Also, there is very little error in the positioning of the QR half-mirror 2 and plane glass 9, ensuring precise correction of the image-formation position.

To facilitate the above explanation, the QR half-mirror 2 and plane glass 9 were described as being inserted into the main optical system at an angle of 45 degrees and 90 degrees respectively. However, it is to be understood that the invention is not limited to these conditions. Instead, the angles at which these members are disposed relative to the main optical system, as well as other design conditions, can be suitably modified as required. This also applies to the angle between the QR half-mirror 2 and the plane glass 9, which was described as being 90 degrees. If required by the drive configuration, installation space or other such factors, the two members can be set at a different angle.

As described in the foregoing, a terrestrial telescope with a digital camera according to the invention employs an optical element that is inserted into the optical axis of the imaging optical system to correct for any change in image-formation position when the optical-path-splitting means is retracted from the optical path of the imaging optical system during imaging. Imaging can therefore be continuously performed with no loss of light, and the focus position of the imaging element can be corrected by means of a configuration that is simple and low in cost, having no need for calculation means or means for driving and controlling the optical element.

In particular, the optical element is a plane glass element having a thickness that corrects for the change in the image-formation position produced by the retraction of the optical-path-splitting means. This allows deviation in the focus position to be corrected with a straightforward, low-cost apparatus with a simple optical element.

The retraction of the optical-path-splitting means and the insertion of the optical element are controlled by means of a guide lever member that supports the imaging position correction means on one end and the optical-path-splitting means on the other end. Such a configuration uses few parts and is therefore simple and low-cost, but fully able to precisely correct the image-formation position.

Prescribed optical filtering properties can be imparted to the optical element and to the exit side of the imaging element of the optical-path-splitting means. This makes it possible to optimize the conditions for imaging, observation, pre-imaging exposure control and automatic focusing control.

Also, a configuration is used in which the plane glass is inserted perpendicularly to the optical axis of the imaging optical system. Such a configuration allows the corrective effect of the plane glass to be applied equally with respect to imaging light from any direction. It also serves to help optimize the automatic focusing control conditions and prevents degradation of the acquired image.

What is claimed is:

1. A terrestrial telescope with a digital camera comprising:
   a group of objective lenses;
   an imaging optical system having an optical path and including the group of objective lenses and an imaging element disposed along the optical path at a position at which an image of a subject is formed by the group of objective lenses;
   an optical-path-splitting means disposed on the optical path of the imaging optical system between the group of objective lenses and the imaging element so as to be retractable from the optical path of the imaging optical system during imaging;
   an observation optical system for observing an optical image of the subject via the optical-path-splitting means disposed on the optical path of the imaging optical system; and
   imaging position correction means including an optical element insertable into the optical path of the imaging optical system to correct for any change in image-formation position when the optical-path-splitting means is retracted from the optical path of the imaging optical system during imaging.

2. A terrestrial telescope with a digital camera according to claim 1; wherein the optical element comprises a plane glass element having a thickness effective to correct for a change in image-formation position produced by retraction of the optical-path-splitting means.

3. The A terrestrial telescope with a digital camera according to claim 2; wherein the plane glass element is inserted perpendicularly to the optical path of the imaging optical system.

4. A terrestrial telescope with a digital camera according to claim 2; wherein the thickness of the plane glass element is determined based on disposing the optical-path-splitting means at a certain angle on the optical path of the imaging optical system.

5. A terrestrial telescope with a digital camera according to claim 4; wherein the certain angle is 45°.

6. A terrestrial telescope with a digital camera according to claim 1; wherein retraction of the optical-path-splitting means and insertion of the optical element are controlled by a guide lever that supports the imaging position correction means on one end and the optical-path-splitting means on another end.

7. A terrestrial telescope with a digital camera according to claim 1; wherein the optical element has one or more prescribed optical filter characteristics.

8. A terrestrial telescope with a digital camera according to claim 7; wherein the one or more prescribed optical filter characteristics comprise one or more of infrared light-blocking filter characteristics, spatial frequency filter chacacteristics polarizing filter characteristics and ND filter characteristics.

9. A terrestrial telescope with a digital camera according to claim 1; wherein the optical-path-splitting means has one or more prescribed optical filter characteristics imparted to the side of the optical-path-splitting means from which light exits to the imaging element.

10. A terrestrial telescope with a digital camera according to claim 9; wherein the one or more prescribed optical filter characteristics comprise one or more of infrared light-blocking filter characteristics, spatial frequency filter characteristics, polarizing filter characteristics and ND filter characteristics.

11. A terrestrial telescope with a digital camera comprising: a group of objective lenses for forming an optical image of a subject and transmitting the optical image along an optical axis; an imaging optical system disposed along the optical axis and including the group of objective lenses and an imaging element; an observation optical system for observing the optical image of the subject transmitted by the group of objective lenses; an optical splitter mounted to undergo movement between (1) a first position in which the optical splitter is inserted into the optical axis between the group of objective lenses and the imaging element and directs a split portion of the optical image transmitted by the group of objective lenses to the imaging element so that the optical image is focused on the image element at a position deviated from a position at which the optical image would be focused if the optical splitter were not inserted into the optical axis and directs another split portion of the optical image to the observation optical system to enable observation of the optical image, and (2) a second position in which the optical splitter is retracted from the optical axis; and an optical correction element movable into the optical axis when the optical splitter is in the second position to correct for deviation of the focus position of the optical image of the subject caused by retraction of the optical splitter from the optical axis and movable out of the optical axis when the optical splitter is in the first position.

12. A terrestrial telescope with a digital camera according to claim 11; wherein the optical splitter directs a substantially greater split portion of the optical image to the observation optical system than to the imaging element.

13. A terrestrial telescope with a digital camera according to claim 11; further including a movable lever, the optical splitter and the optical correction element being mounted to the lever at different locations so that movement of the lever in one direction moves the optical splitter to the first position while moving the optical correction element out of the optical axis and movement of the lever in a direction opposite to the one direction moves to the optical splitter to the second position while moving the optical correction element into the optical axis.

14. A terrestrial telescope with a digital camera according to claim 13; wherein lever has two generally opposite ends and is mounted to undergo movement about an axis located between the two ends, the optical splitter being mounted to one of the ends and the optical correction element being mounted to the other of the ends.

15. A terrestrial telescope with a digital camera according to claim 13; wherein the optical splitter and the optical correction element are disposed on the lever such that the optical splitter intersects the optical axis at an angle of 45° when in the first position and the optical correction elements intersects the optical axis at an angle of 90° when moved into the optical axis.

16. A terrestrial telescope with a digital camera according to claim 11; wherein the optical correction element comprises a glass element having a predetermined thickness effective to correct for deviation of the focus position of the optical image caused by retraction of the optical splitter from the optical axis.

17. A terrestrial telescope with a digital camera according to claim 16; wherein the predetermined thickness of the glass element is determined based on an angle at which the optical splitter intersects the optical axis when in the first position.

18. A terrestrial telescope with a digital camera according to claim 17; wherein the angle at which the optical splitter intersects the optical axis when in the first position is 45°.

19. A terrestrial telescope with a digital camera according to claim 17; wherein the glass element comprises a plane glass element which intersects the optical axis perpendicularly when moved into the optical axis.

20. A terrestrial telescope with a digital camera according to claim 11; wherein the optical splitter comprises a quick-return half-mirror which, when inserted into the optical axis, transmits a split portion of the optical image to the imaging element and reflects another split portion of the optical image to the observation optical system.

* * * * *